United States Patent [19]

Begeman et al.

[11] 4,345,251

[45] Aug. 17, 1982

[54] SOLID STATE COMMUTATOR SWITCH

[75] Inventors: Robert H. Begeman; Barry D. Sanderson; Donald C. Weiss, all of Indianapolis; David L. Zeph, Westfield, all of Ind.

[73] Assignee: The United States of America as represented by the Secretary of the Navy, Washington, D.C.

[21] Appl. No.: 236,474

[22] Filed: Feb. 20, 1981

[51] Int. Cl.³ .......................... H04Q 9/00; G06J 1/00; G01C 17/00
[52] U.S. Cl. .......................... 340/825.86; 340/825.89; 340/27 NA; 340/27 AT; 364/434
[58] Field of Search ........ 340/825.89, 27 NA, 825.86, 340/27 AT, 825.8, 825.03; 364/434; 370/67

[56] References Cited

U.S. PATENT DOCUMENTS

| | | | |
|---|---|---|---|
| 3,959,596 | 5/1976 | Bojanek et al. | 370/67 |
| 4,057,711 | 11/1977 | Asthana et al. | 340/825.03 |
| 4,075,608 | 2/1978 | Koenig | 340/825.8 |
| 4,158,885 | 6/1979 | Neuberger | 340/27 AT |

Primary Examiner—Donald J. Yusko

[57] ABSTRACT

A switching system for connecting a plurality of input signals to a plurality of selected outputs. A plurality of input signals are connected to a crosspoint matrix through a buffer circuit. The crosspoint switching matrix is comprised of a plurality of CMOS crosspoint switch integrated circuits and switching is controlled by a microprocessor which provides the desired connections for selected outputs. A built-in-test circuit (BITE) is provided for testing each circuit path in the switching system.

8 Claims, 5 Drawing Figures

SOLID STATE COMMUTATOR SWITCH

BACKGROUND OF THE INVENTION

The present invention relates to a switching system and more particularly to a solid state switching system for switching a plurality of input signals to selected outputs.

Mechanical type step commutator switches have, in the past, been used to switch one or more input signals to selected outputs. These mechanical switches have several disadvantages, the main one being that discontinuities sometimes occur due to worn or dirty switch contacts. When malfunction occurs, excessive downtime of associated equipment occurs and, if the equipment is in the field or on shipboard, it is frequently not possible to make repairs and the units must be returned to an overhaul facility. Also, if the switch is to be operated from a remote position, a mechanical servomechanism is required and this device frequently provides additional difficulties.

SUMMARY OF THE INVENTION

The present invention relates to a solid state commutator step switch for connecting a plurality of input signals to selected outputs. Each of a plurality of input signals are connected to a solid state crosspoint switching matrix through buffer circuits and the matrix outputs are connected to a plurality of output drivers. The crosspoint switching matrix is comprised of a plurality of CMOS crosspoint switch integrated circuits which have on/off states. The on/off states of the crosspoint switches are controlled by a plurality of latch controls by information supplied from a microprocessor.

As a very large number of switching circuits are frequently used, especially in military equipment, built in test equipment (BITE) is provided for rapidly testing each circuit path and for providing an indication of any faulty circuits.

It is therefore a general object of the present invention to provide a solid state step switch which is highly reliable and easily maintained.

Another object of the present invention is to provide a solid state switching system that does not have moving parts.

Still another object of the present invention is to provide a switching system which is controlled by a microprocessor which is also used with testing circuitry to indicate any faulty components.

Other objects, advantages, and novel features of the present invention will become apparent from the following detailed description of the invention when considered in conjunction with the accompanying drawings.

DESCRIPTION OF THE PREFERRED EMBODIMENT

Figure 1:
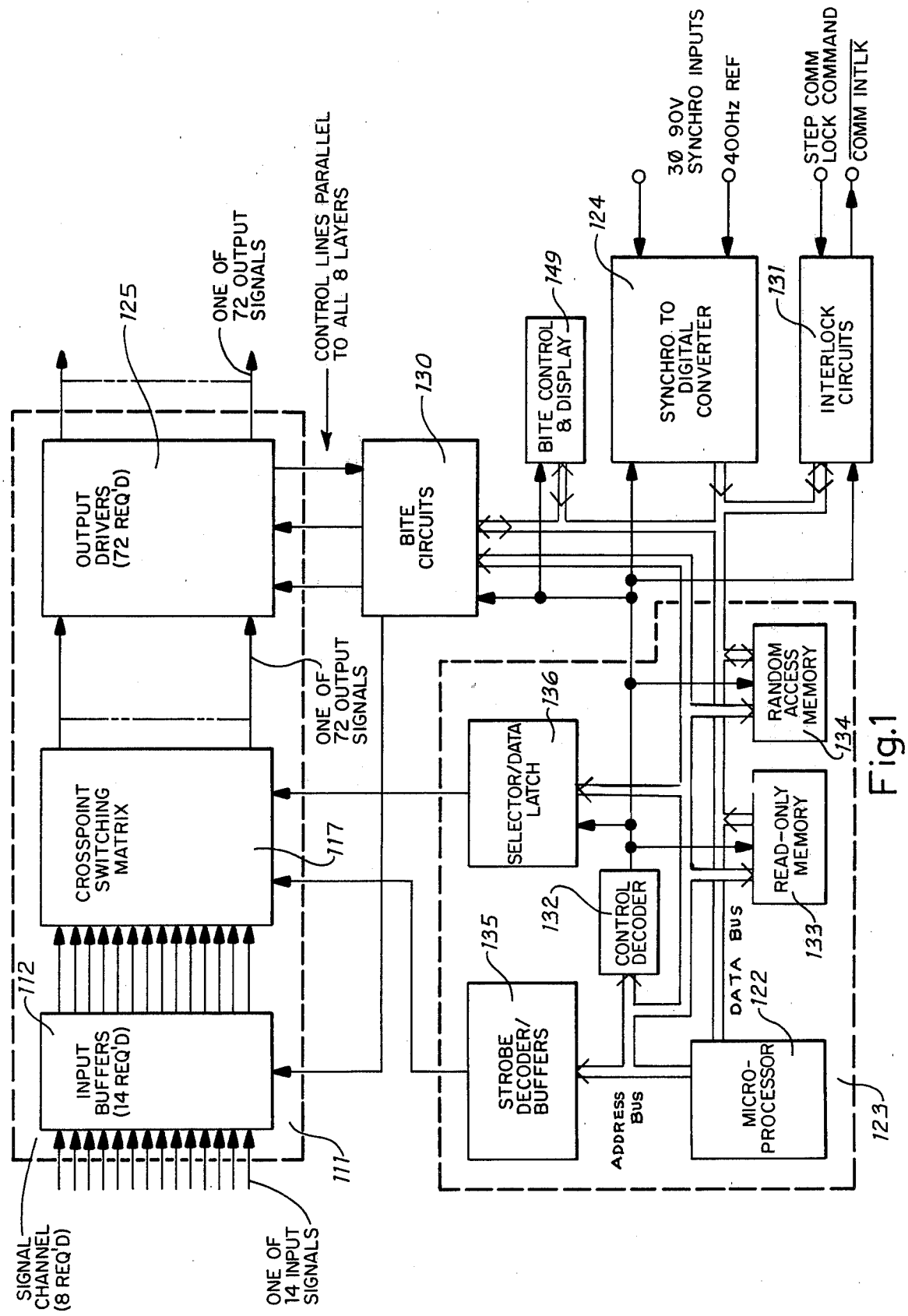
FIG. 1 is a block diagram showing one of eight identical signal channels of a preferred embodiment.

Referring to the drawings, there is shown an embodiment of the invention which was designed for use in a Sonar Detecting-Ranging Set. In this sonar system, there is a transducer comprised of a large cylindrical array of 576 elements and a switching system or commutator switch, is required to steer transmit drive signals to a desired azimuth sector. The commutator switch provides 576 outputs, one for each of the 576 elements in the array, and the 576 outputs are divided into eight layers, each with 72 outputs. As will be later described, each of the 8 layers receives 14 inputs to the switching systems which are used to provide the desired output to 72 elements. It should be understood, however, that the invention will have broad application and is not limited to the specific embodiment hereinafter described.

Referring now to FIG. 1 of the drawings, there is shown a signal channel 111, which is one of eight identical channels used in a commutator switch in the above-identified Sonar Set. Signal channel 111 receives fourteen input signals and produces seventy-two output signals. The function of each of the signal channels 111 is to sequentially connect twelve of the input signals to a contiguous group of twelve outputs to the right of a selected bearing signal and also connected the same twelve input signals in a "mirror image" to a contiguous group of twelve outputs to the left of the selected bearing center. The thirteenth input signal is connected to a twenty-four outputs to the right of the first twelve outputs and the fourteenth input signal is connected to twenty-four output signals to the left of the second twelve output signals. Each input signal (fourteen total) consists of a sine wave burst up to 17 V. peak-to-peak in amplitude at a low duty cycle repetition rate. Each input signal is processed by an identical buffer circuit 112 which provides a high input impedance, attenuates the signal level, shifts the DC voltage level of the signal, protects succeeding circuits from excessive voltage levels and facilitates injection of test signals used for automatic testing of signal channel operation. A typical buffer output consists of a 2 V. peak-to-peak sine wave burst with a DC level centered at +2.5 V. DC.

Figure 2:
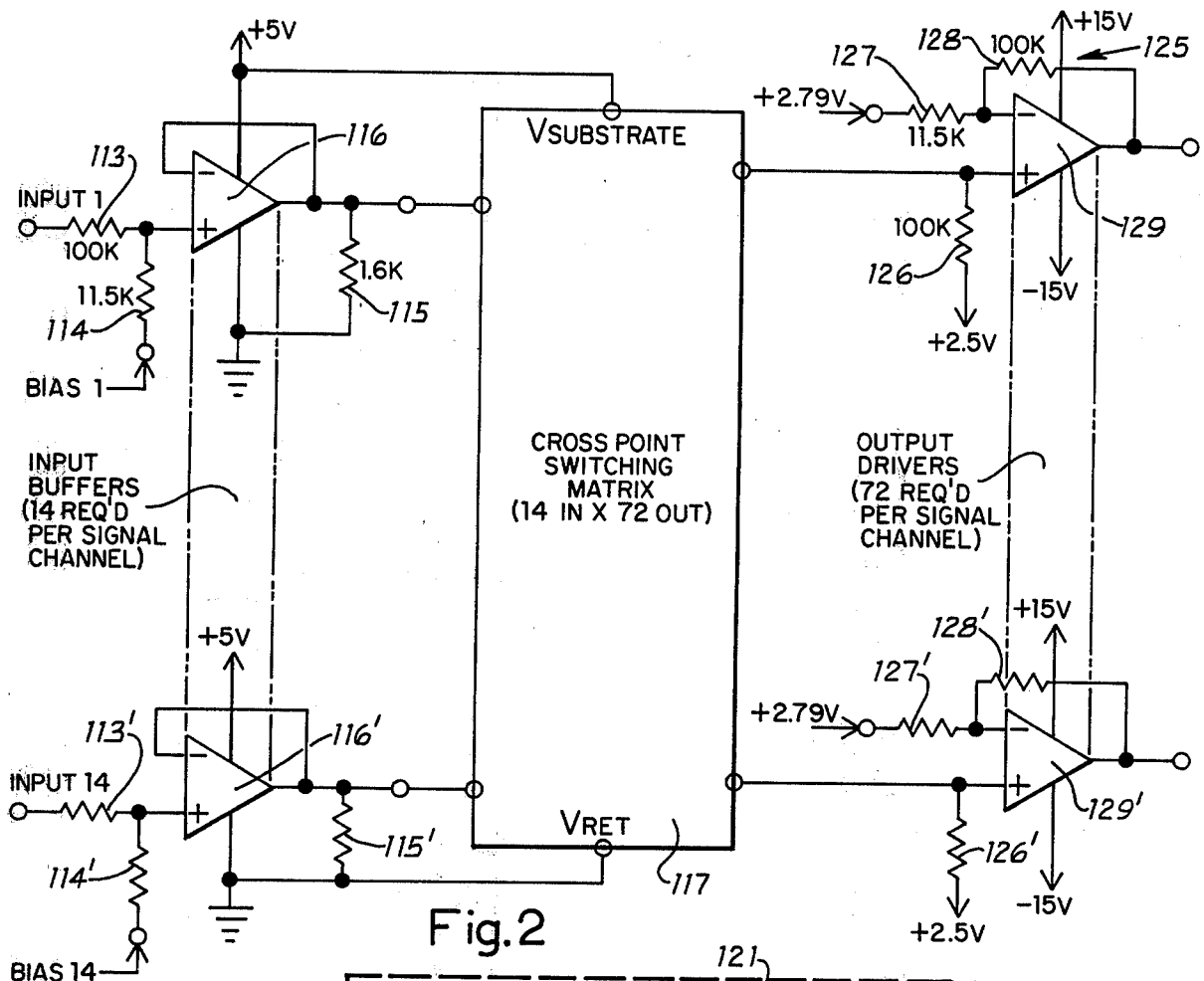
FIG. 2 is a circuit diagram showing in detail the input buffers and output drivers shown in FIG. 1.

Referring now to FIG. 2 of the drawings, there is shown in greater detail the fourteen input buffers which are required for each signal channel 111. Each buffer circuit is comprised of three resistors 113, 114, and 115, and an operational amplifier 116. During normal operation, a 17 V. peak-to-peak sine wave with a 0.0 V. DC level is applied to INPUT 1, with +2.79 V. DC being applied to BIAS 1. The voltage divider formed by resistors 113 and 114 attenuates the sine wave to 1.75 V. peak-to-peak, with a +2.5 V. DC level. Amplifier 116 is connected as a non-inverting unity gain voltage follower, with resistor 115 serving as a load resistance. Amplifier 116 operates from a single +5 V. power supply in order to limit the output voltage swing between 0 V. and +5 V. which protects the crosspoint switching matrix 117 from possible excessive voltages.

Figure 3:
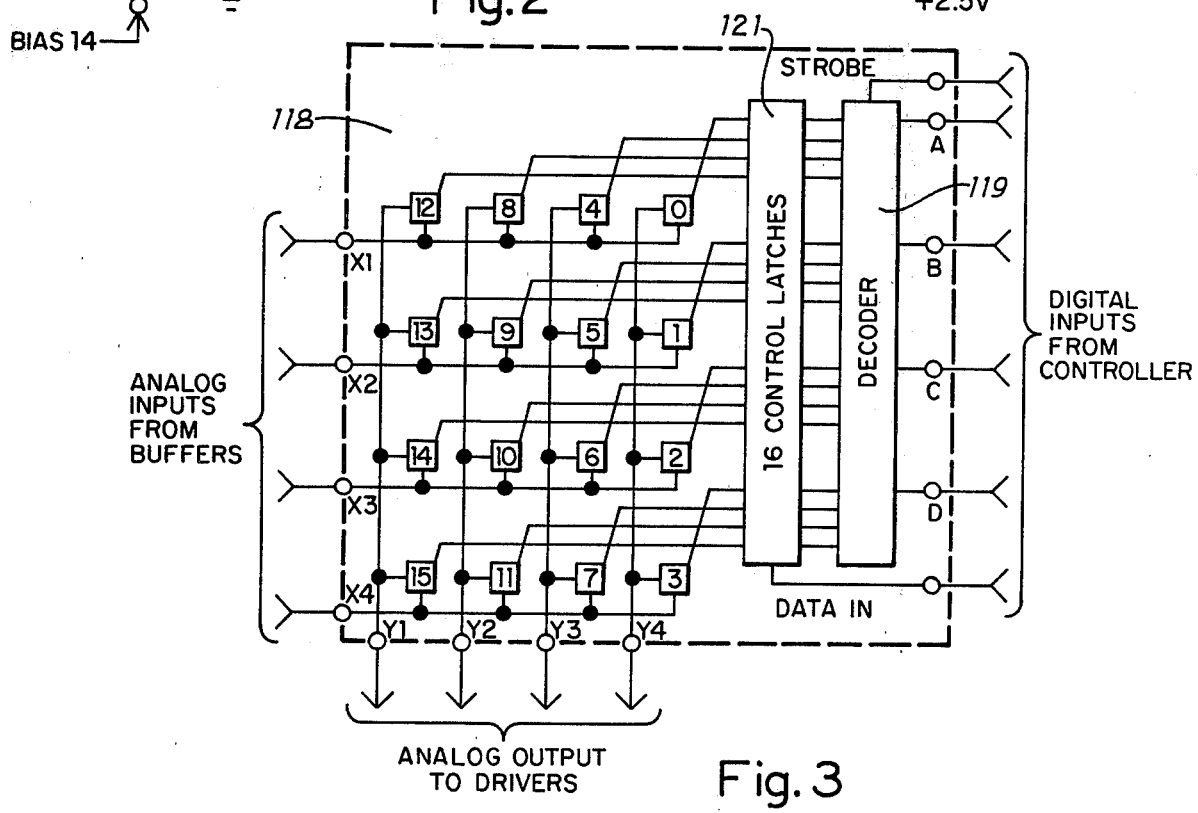
FIG. 3 is a circuit diagram showing in detail a portion of a crosspoint switching matrix.
Figure 4:
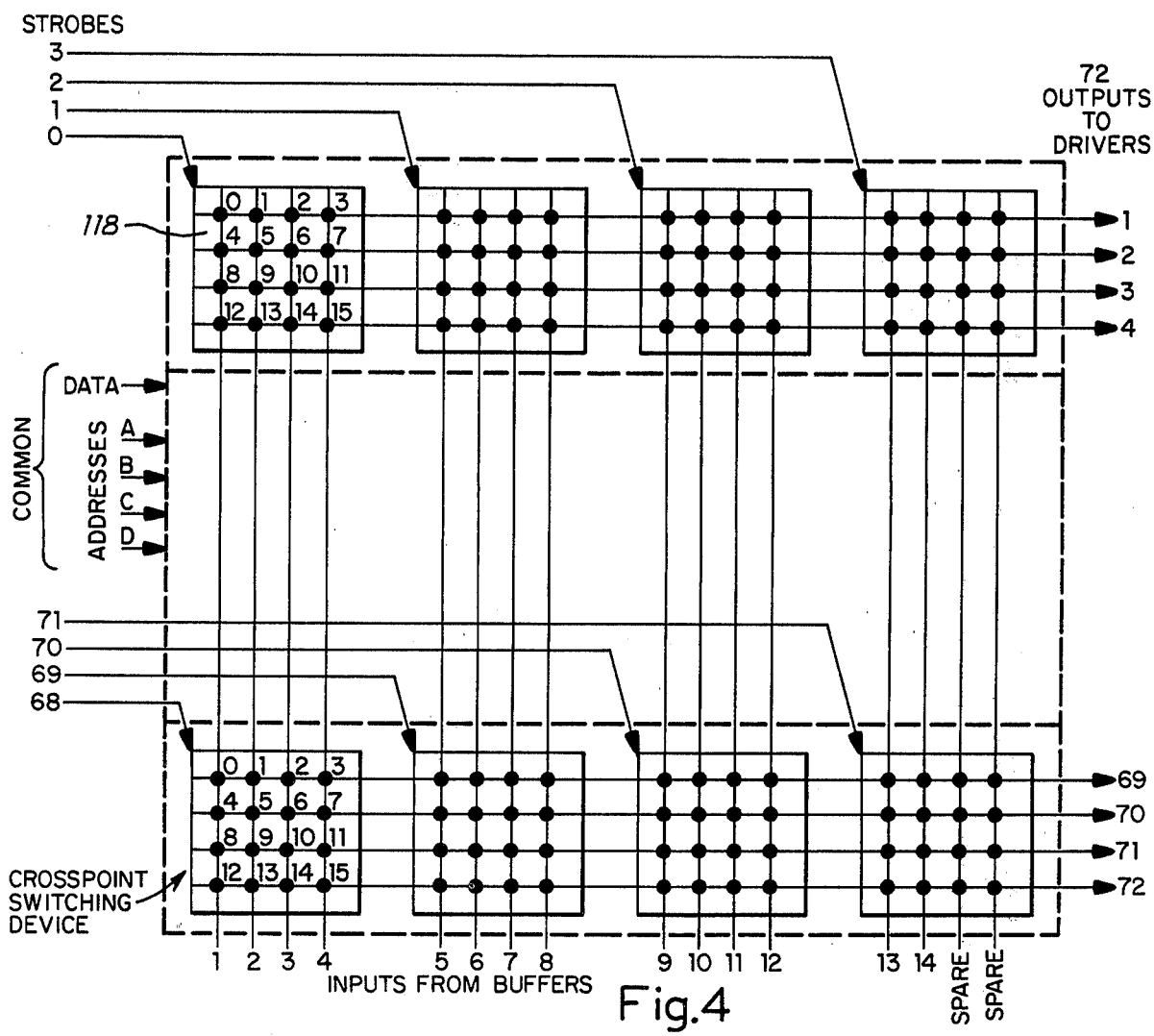
FIG. 4 is a diagram showing a plurality of crosspoint switching devices.

Referring now to FIGS. 1, 3, and 4 of the drawings, the fourteen buffer circuits 112 have their outputs connected to a crosspoint switching matrix 117. The function of crosspoint switching matrix 117 is to connect any of the fourteen signal inputs to any of the seventy-two outputs. Each individual crosspoint switch element uses a Complementary Metal Oxide Semiconductor (CMOS) device which has a high "off" resistance and a low "on" resistance. Control signals are provided to the crosspoint switch matrix 117 which turn on only the CMOS devices which are necessary to connect the fourteen inputs to the appropriate seventy-two outputs as required for correct signal channel operation. The voltage level at the seventy-two outputs of the crosspoint switching matrix 117 are the same as the levels at the fourteen inputs. As best shown in FIG. 3 of the drawings, the crosspoint switching matrix is comprised of an integrated circuit device having a 1-of-16 decoder 119, sixteen control latches 121 and sixteen CMOS signal transmission gates (numbered 0–15), which are connected in a 4-input, 4-output array.

Decoder 119 receives a 5-bit binary control word from controller 123, which is transferred to one of the sixteen control latches 121 when the strobe input is enabled. Each control latch 121 controls the on/off state of a different transmission gate and the on/off state of each gate is determined by the logic level of the data input line when the address for the gate is strobed. This arrangement permits random control of the state of each transmission gate and is compatible with microprocessor control techniques.

Referring now to FIG. 4 of the drawings, there is shown a crosspoint switching matrix for one signal channel 111. The matrix is comprised of seventy-two crosspoint switching devices 118, each with a separate strobe line; however, the address and data lines from controller 123 are connected in parallel to all seventy-two devices within the matrix. Transmission gates within the crosspoint switching devices are represented by numbered dots at the intersection of input and output lines. During normal operation, controller 123 receives data from a synchro-to-digital converter 124 indicating the required bearing position. When a change in bearing position is required, controller 123 first generates a sequence which turns off all transmission gates in the crosspoint switching matrix 117. This is done by holding the DATA line at logical "0", cycling through all sixteen possible address codes, and enabling all seventy-two strobe lines together during each of the sixteen address codes. Controller 123 then generates a sequence which turns on a particular set of seventy-two transmission gates as required for a given bearing. This is done by holding the DATA line at logical "1" and generating only those addresses and individual strobes required for a given bearing position. By way of example, if the selected bearing angle is 0 degrees, the bearing is centered on outputs 1 and 72, and transmission gates labeled 12, 9, 6, and 3 at strobe point 68 are turned on, connecting inputs 1, 2, 3, and 4, to outputs 72, 71, 70, and 69, respectively. Interleaved with this is the turning on of transmission gates 0, 5, 10, and 15 at strobe point 0, connecting inputs 1, 2, 3, and 4, to outputs 1, 2, 3, and 4, respectively. This sequence continues through the matrix until inputs 5, 6, 7, 8, 9, 10, 11, and 12 are connected to outputs 68, 67, 66, 65, 64, 63, 62, and 61, respectively, and to outputs 5, 6, 7, 8, 9, 10, 11, and 12 respectively. The sequence concludes by connecting input 13 to outputs 60 through 37 and input 14 to outputs 36 through 13. This entire sequence is completed by the controller in six milliseconds. When another change in bearing is required, all transmission gates will be turned off, controller 123 will determine the new bearing center, and the turn on sequence for the new bearing center will be generated.

The seventy-two outputs from crosspoint matrix 117 are connected to seventy-two output drivers 125. The function of output drivers 125 is to provide a high input impedance to prevent loading of crosspoint switching matrix 117, to amplify the output signal levels, to shift the DC level of the signals and to provide a low output impedance to drive the required load. Output drivers 125 also provide for multiplex sampling of output test signals during automatic testing of signal channel operation. A typical output driver waveform consists of a 17 V. peak-to-peak sine wave burst with a DC level centered at 0.0 V. DC.

Referring again to FIG. 2 of the drawings, it can be seen that each output driver 125 is comprised of resistors 126, 127, and 128, and an operational amplifier 129. Amplifier 129 is connected as a non-inverting amplifier with a gain of 9.7, and with a +2.79 V. DC bias applied to resistor 127, the resulting DC level output is 0.0 V. DC. As the +2.79 V. DC bias applied to amplifiers 116 is derived from the same source as the +2.79 V. DC bias applied to amplifiers 129, changes in the value of the bias voltage are not transmitted to the driver outputs because of the differential rejection of amplifiers 129. This unique connection insures a low DC offset voltage at the driver output and eliminates the need for coupling capacitors. Resistor 126 is connected to a 2.5 V DC bias voltage in order to maintain the required 0 V. DC level at the driver outputs when the crosspoint switches are disabled during changes in switch bearing and during BITE operation, which will be hereinafter discussed.

During normal operation, a 1.75 V. peak-to-peak sine wave with a +2.5 V DC level is applied at the driver inputs resulting in a 17 V. peak-to-peak sine wave with a 0.0 V. DC level at the outputs. During BITE operation, however, a 0.103 V. peak-to-peak square wave is applied to selected driver inputs resulting in a 1.0 V. peak-to-peak square wave with a 0.0 V. DC level at the outputs. This level of BITE operation will not trigger the succeeding transmitter circuits but will provide a test of analog channel gain, DC level, and crosspoint switch operation.

Control signals for the switching sequence are provided by controller 123. All input and output signals for controller 123 are logic levels or pulse waveforms from 0 to +5 V. In normal operation, controller 123 monitors a 12 bit digital word representing the desired bearing center from the synchro-to-digital converter 124. Controller 123 then determines, within a five degree increment, which bearing is to be selected. If a charge in bearing is required, controller 123 generates a proper sequence of control signals to actuate crosspoint switching matrix 117 in order to connect the input signals to the appropriate output drivers in an aperture centered about the desired bearing. Since all eight signal channels are directed to the same bearing center, the control signals to the eight crosspoint switching matrixes are connected in parallel. The controller then sets the "COMM INTLK" interlock signal in interlock circuit 131 to indicate that the change in bearing has been completed. The bearing center of crosspoint switching matrix 117 will then be maintained until the input bearing changes to another five degrees segment.

The key element in controller 123 is microprocessor 122. Microprocessor 122 provides sequential control of a number of programmed steps and performs arithmetic operations to permit program decisions based on numerical results. Processed data flows to and from microprocessor 122 on an eight bit, bidirectional data bus. The microprocessor also drives a 16 bit address bus used to designate locations of input and output data points. A control decoder circuit 132 decodes specific codes from the address bus and provides enabling signals to various input/output devices.

A read-only memory 133 provides for storage of up to 2048, eight-bit binary words used for program control by microprocessor 122. Word selection is controlled by eleven bits from the microprocessor address bus. Since the binary words are permanently stored in read-only memory 133, the data is retained even when power is not applied. Temporary storage of data is provided by a random-access memory 134. Eight bit data words are transferred into random-access memory 134 by microprocessor 122, then recalled later when needed. Data word locations are selected using ten bits from the microprocessor address bus.

A strobe decoder/buffers circuit 135 uses eight bits from the microprocessor address bus and enables one of seventy-two outputs used to control crosspoint switching matrix 117 in the signal channels. A selector/data latch 136 is used to hold five data bits from the microprocessor data bus. These five data bits, when used in conjunction with the seventy-two outputs of strobe decoder-buffers 135 control the selection and on/off state of the FET devices in the crosspoint switching matrix 117.

Synchro-to-digital converter 124 receives 90 V RMS three phase, 400 Hz synchro signals representing a desired bearing center and converts this data to a 12 bit natural binary digital word. A 115 V RMS 400 Hz, reference voltage is also supplied to synchro-to-digital converter 124 as a phase reference for correct angle decoding.

Interlock circuits 131 are used to interface two 0 to +5 V. logic signals required to synchronize the operation of the switch with the sonar system being used. The "STEP COMM LOCK COMMAND" signal inhibits rotation of the switch during transmission of a sine wave burst. The "COMM INTLK" signal is developed by the switch to indicate when a change in bearing has been completed.

BUILT-IN TEST EQUIPMENT (BITE)

Figure 5:
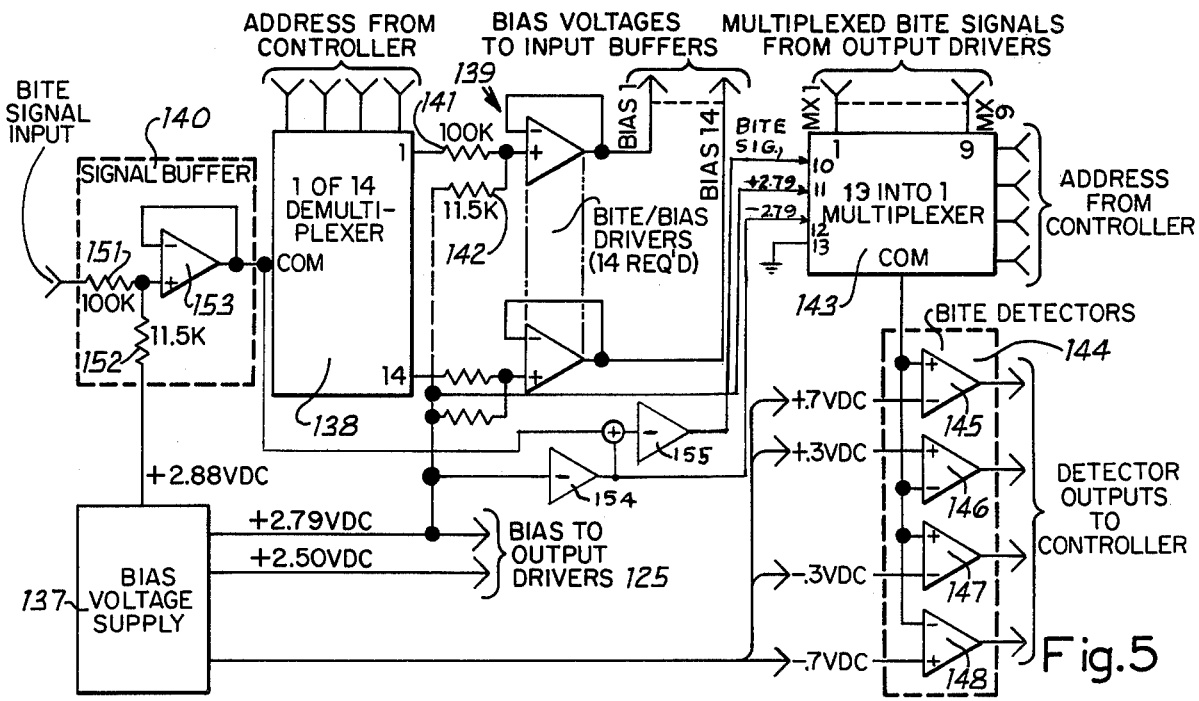
FIG. 5 is a diagram of an analog test circuit built into the embodiment shown in FIG. 1.

Referring now to FIG. 5 of the drawings, circuitry (Number 130 in FIG. 1) is provided for testing of circuit paths in the signal channels 111. Test signals are applied to each input line, and each transmission gate is tested individually for both "on" and "off" conditions. The test circuitry verifies both the integrity of the transmission gates and the ability of controller 123 to select a proper gate address. Analog BITE circuits are used in a sequence of tests directed by controller 123. In this sequence, each input buffer, each transmission gate in crosspoint switching matrix 117 and each output driver 125 is tested for signal gain and DC voltage offset. If a fault is detected, controller 123 determines which part of the signal channel is faulty and displays a hexadecimal address code indicating location of the failed component. A bias voltage supply 137 provides seven DC reference voltages used for biasing in the signal channels and for BITE testing. These voltages are fixed in both normal and BITE operating modes. In the BITE mode, a 0 to +5 V. square wave signal is supplied to signal buffer 140 via resistor 151. The voltage divider formed by resistor 151 and 152 along with the +2.88 V. DC bias voltage to resistor 152 changes the square wave signal to 1.12 V peak-to-peak, with a +2.79 V. DC level. Operational amplifier 153 is connected as a non-inverting unity gain voltage follower. The 1 of 14 demultiplexer 138, as directed by a 4-bit binary address from the controller 123, selects which input buffer 112 in the signal channels is to be tested. The demultiplexer outputs are connected to the input buffers via the BITE/bias drivers 139. If input buffer number 1 is selected for test, the 1.12 V. peak-to-peak square wave is applied to resistor 141 and attenuated by resistor 142 to an amplitude of 0.115 V. peak-to-peak. During normal operation, demultiplexer 138 is disabled, and the +2.79 V. DC bias is applied through resistor 142. In the event that the BITE circuits are disabled by faulty components, the +2.79 V. DC bias voltage, which is essential for proper operation of the signal channels, will be maintained to the input buffers 112. Operational amplifier 139 is connected as a non-inverting unity gain voltage follower. Each of the 14 BITE/bias driver 138 outputs is connected in parallel to the respective input buffer 112 of all eight signal channels.

During BITE operation, the 0.115 V. peak-to-peak square wave at the BITE/bias driver outputs is converted to a 1.0 V. peak-to-peak square wave with a 0.0 V. DC level at each of the 576 signal channel driver outputs in turn. These 576 BITE signals are time multiplexed into 9 lines as sequenced by the controller 123. The 13 into 1 multiplexer 143 further multiplexes the 576 outputs into one line. During the automatic test sequence, each of the 576 outputs is examined for both on and off conditions of the 14 transmission gates connected to that output in the crosspoint switching matrix 117. This sequence is completed in approximately 2 seconds.

Test level checks on the multiplexer output are performed by the BITE detectors 144. The BITE detector consists of four voltage comparators, 145, 146, 147, and 148 which provide 0.0 to +5 V. logic levels to controller 123. Input threshold levels for the four comparators are provided by the bias voltage supply 137. On the positive step of the test square wave, comparators 145 and 146 both provide a logic 0 output, if the square wave level is between +0.3 V. and +0.7 V. On the negative step of the test square wave, comparators 147 and 148 provide a logic 0 output, if the square wave level is between −0.3 V. and −0.7 V. By comparing these logic levels during specific time intervals, controller 123 determines if the test square wave levels are correct for each of signal paths tested.

In order to verify the results of the BITE test on the circuit paths, a separate BITE test function is provided. This circuit generates signals which test each of the threshold levels in each of the four comparators, 145, 146, 147, and 148. The +2.79 V DC level from the bias voltage supply 137 is inverted by inverting amplifier 154 to produce −2.79 V. DC. A sample of the output of signal buffer 140 is summed with the −2.79 V. DC voltage at the input of inverting amplifier 155. The output of inverting amplifier 155 is a 1.12 V. peak-to-peak square wave with a 0.0 V. DC level which is applied to input number 10 of 13 into 1 multiplexer 143 in order to simulate the correct output from a signal channel driver during normal BITE operation. Voltage levels of +2.79 V. DC, −2.79 V. DC, and 0.0 V. DC are applied to input numbers 11, 12, and 13 of the 13 into 1 multiplexer in order to simulate values which will give fail indications in the BITE detectors 144.

Whenever the analog BITE tests are initiated by the operator, the controller 123 first selects the four BITE test signals from 13 into 1 multiplexer 143 and verifies that the correct pass/fail codes are generated by BITE detectors 144. If the BITE test function indicates that the BITE circuits are not operating correctly, a fail indication is displayed.

Testing is initiated by an operator whenever it is desired to verify the operation of signal channels 111, or to find the location of a fault. Manual control of the BITE circuits 130 is provided by a BITE control and display circuit 149. Circuit 149 is comprised of selector switches and a five digit, hexadecimal Light-Emitting Diode (LED) display which is used to indicate the results of the testing.

While the present invention has been illustrated and described in relation to a specific sonar operation, it should be understood that many modifications and variations are possible in the light of the above teachings.

We claim:

1. A solid state switching system for connecting a plurality of input signals to a plurality of selected transducer elements comprising,
   a plurality of input conductors,
   a plurality of transducer elements positioned in a circular array,
   a crosspoint switching matrix having a plurality of on/off solid state switching elements for connecting any of said input conductors to any of said transducer elements,
   first means for selectively producing a binary number indicative of a digitized bearing position, and
   control means connected with said first means for controlling the states of said on/off solid state switching elements whereby said plurality of input conductors are electrically connected with a transducer having a bearing position corresponding to said digitized bearing position and to transducers contiguous thereto.

2. A switching system as set forth in claim 1 wherein said control means includes a microprocessor.

3. A switching system as set forth in claim 2 wherein said switching matrix is comprised of a plurality of CMOS crosspoint switch integrated circuits having on/off states controlled by a plurality of latch controls and said microprocessor.

4. A switching system as set forth in claim 3 having builtin testing circuitry for testing said on/off states of said switching elements.

5. A switching system as set forth in claim 4 wherein said testing circuitry is controlled by said microprocessor.

6. A switching system as set forth in claim 5 having a light-emitting diode display for indicating results of testing.

7. A solid state switching system as set forth in claim 1 wherein each said input conductor is electrically connected to said crosspoint switching matrix through a buffer circuit having an operational amplifier.

8. A solid state switching system as set forth in claim 7 having a plurality of output drivers and having bias voltages applied to each said buffer circuit and each said output driver for canceling output DC voltage offset errors due to bias voltage drift.

* * * * *